US011709780B2

United States Patent
Gole et al.

(10) Patent No.: US 11,709,780 B2
(45) Date of Patent: Jul. 25, 2023

(54) METHODS FOR MANAGING STORAGE SYSTEMS WITH DUAL-PORT SOLID-STATE DISKS ACCESSIBLE BY MULTIPLE HOSTS AND DEVICES THEREOF

(71) Applicant: NetApp, Inc., San Jose, CA (US)

(72) Inventors: Abhijeet Gole, Cupertino, CA (US); Ratnesh Gupta, Dublin, CA (US); Douglas Doucette, San Diego, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/828,370

(22) Filed: May 31, 2022

(65) Prior Publication Data
US 2022/0292031 A1 Sep. 15, 2022

Related U.S. Application Data

(63) Continuation of application No. 16/855,243, filed on Apr. 22, 2020, now Pat. No. 11,386,015.

(51) Int. Cl.
*G06F 12/10* (2016.01)
*G06F 12/1009* (2016.01)

(52) U.S. Cl.
CPC .. *G06F 12/1009* (2013.01); *G06F 2212/1021* (2013.01); *G06F 2212/154* (2013.01); *G06F 2212/214* (2013.01)

(58) Field of Classification Search
CPC ......... G06F 12/1009; G06F 2212/1021; G06F 2212/214; G06F 2212/154
See application file for complete search history.

(56) References Cited

U.S. PATENT DOCUMENTS

| | | | |
|---|---|---|---|
| 2018/0131633 A1* | 5/2018 | Li | H04L 47/72 |
| 2019/0155777 A1* | 5/2019 | Shim | G06F 3/0613 |
| 2020/0301857 A1* | 9/2020 | Marks | G06F 13/4027 |
| 2020/0356307 A1* | 11/2020 | Subbarao | G06F 12/0246 |

* cited by examiner

*Primary Examiner* — Masud K Khan
(74) *Attorney, Agent, or Firm* — Troutman Pepper Hamilton Sanders LLP (NetApp)

(57) ABSTRACT

Methods, non-transitory machine readable media, and computing devices that manage resources between multiple hosts coupled to dual-port solid-state disks (SSDs) are disclosed. With this technology, in-core conventional namespace (CNS) and zoned namespace (ZNS) mapping tables are synchronized by a host flash translation layer with on-disk CNS and ZNS mapping tables, respectively. An entry in one of the in-core CNS or ZNS mapping tables is identified based on whether a received storage operation is directed to a CNS or a ZNS of the dual-port SSD. The entry is further identified based on a logical address extracted from the storage operation. The storage operation is serviced using a translation in the identified entry for the logical address, when the storage operation is directed to the CNS, or a zone identifier in the identified entry for a zone of the ZNS, when the storage operation is directed to the ZNS.

20 Claims, 7 Drawing Sheets

METHODS FOR MANAGING STORAGE SYSTEMS WITH DUAL-PORT SOLID-STATE DISKS ACCESSIBLE BY MULTIPLE HOSTS AND DEVICES THEREOF

This application is a continuation of U.S. patent application Ser. No. 16/855,243, filed Apr. 22, 2020, which is hereby incorporated by reference in its entirety.

FIELD

This technology relates to data storage systems and, more particularly, to methods and devices for facilitating efficient storage operations using host-managed, dual-port solid-state disks (SSDs) accessible by multiple hosts.

BACKGROUND

Data storage networks often include storage servers and other types of devices hosting applications that store data on solid-state disks (SSDs). Conventional SSDs host a flash translation layer (FTL) and are accessible to only one host device. SSDs have recently been developed that are dual-port drives accessible by multiple host devices (e.g., in a high availability (HA) arrangement).

While the flash storage media of SSDs has traditionally been hidden from the host devices, open channel SSDs, for example, expose the flash storage media to the host device. Exposing the flash storage media of an SSD to the host device enables applications to optimally place data in specific locations in the flash storage media. The FTL in these types of deployments can be moved off of the SSD to the host devices.

Accordingly, in an HA arrangement with two host devices, two FTL instances are executed within the operating system software of the host devices. The FTLs implemented in software on the host devices are responsible for translating storage operations directly to the flash storage media of an SSD, which can be a dual-port drive.

Managing resources, including metadata about where each of the host devices is writing on a dual-port SSD, presents a technical problem due, in part, to the concurrent accessibility to the SSD of the two host devices via the two ports. While the host devices can communicate between one another over a network, the network communications are inefficient and utilize bandwidth and other resources that are more effectively allocated to increasing throughput of storage operations and otherwise improving storage performance.

DETAILED DESCRIPTION

Figure 1:
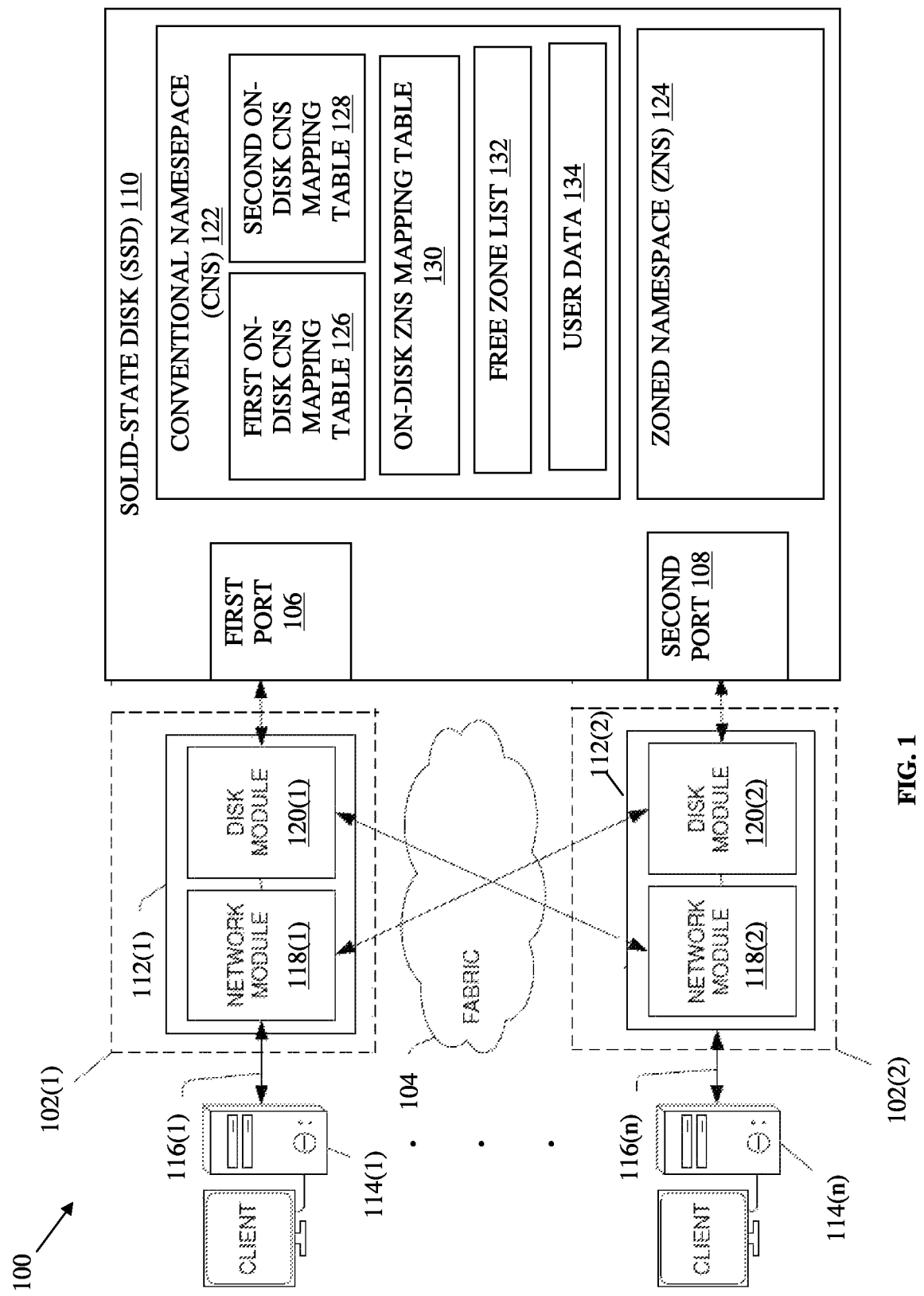
FIG. 1 is a block diagram of a network environment with exemplary host devices coupled to a dual-port solid-state disk (SSD)

A network environment 100 that may implement one or more aspects of the technology described and illustrated herein is shown in FIG. 1. The network environment 100 includes host computing devices 102(1) and 102(2) that are coupled over a data fabric 104 that includes one or more communication network(s) and facilitates communication between the host computing devices 102(1) and 102(2). The host computer device 102(1) and 102(2) are coupled to a first port 106 and a second port 108, respectively, of a host-managed, dual-port solid-state disk (SSD) 110, although any number of other elements or components can also be included in the network environment 100 in other examples. This technology provides a number of advantages including methods, non-transitory computer readable media, and computing devices that efficiently manage resources between host computing devices in high availability (HA) arrangements and coupled to dual-port SSDs.

In this example, nodes 112(1) and 112(2) of the host computing devices 102(1) and 102(2), respectively, can be primary or local storage controllers or secondary or remote storage controllers that provide client devices 114(1)-114(n) with access to data stored within SSD 110. The host computing devices 102(1) and 102(2) of the examples described and illustrated herein are not limited to any particular geographic areas and can be clustered locally and/or remotely. Thus, in one example the host computing devices 102(1) and 102(2) can be distributed over a plurality of storage systems located in a plurality of geographic locations; while in another example a clustered network can include host computing devices 102(1) and 102(2) residing in a same geographic location (e.g., in a single on-site rack).

In the illustrated example, one or more of the client devices 114(1)-114(n), which may be, for example, personal computers (PCs), computing devices used for storage (e.g., storage servers), or other computers or peripheral devices, are coupled to the host computing devices 102(1) and/or 102(2) by network connections 116(1)-116(n). Network connections 116(1)-116(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 114(1)-114(n) may be general-purpose computers running applications and may interact with the host computing devices 102(1) and 102(2) using a client/server model for exchange of information. That is, the client devices 114(1)-114(n) may request data from the host computing devices 102(1) and 102(2) (e.g., data on one of the SSD 110 managed by a network storage controller configured to process I/O commands issued by the client devices 114(1)-114(n)), and the host computing devices 102(1) and 102(2) may return results of the request to the client devices 114(1)-114(n) via the network connections 116(1)-116(n).

While the host computing devices 102(1) and 102(2) are disclosed in this example as including only SSD 110 for storage, multiple SSDs and other types of mass storage devices including hard disk drives (HDDs), magnetic disk drives, and any other similar media adapted to store information, including, for example, data and/or parity information, can also be utilized by the host computing devices 102(1) and 102(2) in other examples. Accordingly, the dual-port SSD 110 can represent one or multiple dual-port SSDs.

The nodes 112(1) and 112(2) of the host computing devices 102(1) and 102(2), respectively, can include network or host nodes that are interconnected as a cluster to provide data storage and management services, such as to an enterprise having remote locations, cloud storage, etc., for example. Such nodes 112(1) and 112(2) can be attached to the data fabric 104 at a connection point, redistribution point, or communication endpoint, for example. One or more of the host computing devices 112(1) and 112(2) may be capable of sending, receiving, and/or forwarding information over a network communications channel, and could comprise any type of device that meets any or all of these criteria.

In an example, the nodes 112(1) and 112(n) may be configured according to a disaster recovery or high availability configuration whereby a surviving takeover node provides switchover access to the SSD 110 in the event a failure or planned takeover event occurs (e.g., the node 112(1) provides client device 114(n) with switchover data access to SSD 110). Additionally, while two nodes and host computing devices are illustrated in FIG. 1, any number of nodes or host computing devices can be included in other examples in other types of configurations or arrangements.

As illustrated in the network environment 100, nodes 112(1) and 112(2) can include various functional components that coordinate to provide a distributed storage architecture. For example, the nodes 112(1) and 112(2) can include network modules 118(1) and 118(2) and disk modules 120(1) and 120(2), respectively. Network modules 118(1) and 118(2) can be configured to allow the nodes 112(1) and 112(2) (e.g., network storage controllers) to connect with client devices 114(1)-114(n) over the storage network connections 116(1)-116(n), for example, allowing the client devices 114(1)-114(n) to access data stored in the network environment 100.

Further, the network modules 118(1) and 118(2) can provide connections with one or more other components through the data fabric 104. For example, the network module 118(1) of node 112(1) can access the SSD 110 by sending a request via the data fabric 104 through the disk module 120(2) of node 112(2). The cluster fabric 104 can include one or more local and/or wide area computing networks embodied as Infiniband, Fibre Channel (FC), or Ethernet networks, for example, although other types of networks supporting other protocols can also be used.

In some examples, the SSD 110 can be locally-attached (e.g., via a system bus). In other examples, disk modules 120(1) and 120(2) can be configured to connect the SSD 110 to the nodes 112(1) and 112(2). In some examples, disk modules 120(1) and 120(2) communicate with the SSD 110 according to Fabric protocols, such as NVMeoF, for example, although other protocols can also be used. Thus, as seen from an operating system on either of node computing devices 112(1) and 112(2), the SSD 110 can appear as locally attached in these examples. In this manner, different nodes 112(1) and 112(2) may access data blocks, files, or objects through the operating system, rather than expressly requesting abstract files.

While the network environment 100 illustrates an equal number of network modules 118(1) and 118(2) and disk modules 120(1) and 120(2), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 114(1)-114(n) can be networked with the nodes 112(1) and 112(2), over the storage connections 116(1)-116(n). As an example, respective client devices 114(1)-114(n) that are networked may request services (e.g., exchanging of information in the form of data packets) of nodes 112(1) and 112(2), and the nodes 112(1) and 112(2) can return results of the requested services to the client devices 114(1)-114(n). In one example, the client devices 114(1)-114(n) can exchange information with the network modules 118(1) and 118(2) residing in the node computing devices 112(1) and 112(2) (e.g., network hosts) in the host computing devices 102(1) and 102(2), respectively.

In one example, the host computing devices 102(1) and 102(2) host aggregates corresponding to physical local and/or remote data storage devices, such as flash media in the SSD 110, for example. The SSD 110 can be part of a mass storage device, such as disks of a disk array. In this particular example, the SSD 110 is a dual-port SSD including the first port 106 and the second port 108, although another number of ports can be provided in other examples. The SSD 110 optionally includes device memory (e.g., dynamic random access memory (DRAM) and flash media), which includes a conventional namespace (CNS) 122 and a zoned namespace (ZNS) 124. Accordingly, the SSD 110 supports the ZNS 124 that consists of a set of logical zones that can be read, written, or erased as a unit as well as the CNS 122 that support random block read/write.

The CNS 122 includes a first on-disk CNS mapping table 126, a second on-disk CNS mapping table 128, an on-disk ZNS mapping table 130, an optional free zone list 132, and user data 134. The first on-disk CNS mapping table 126, the second on-disk CNS mapping table 128, and/or the on-disk ZNS mapping table 130 are stored in this example at respective locations (e.g., reserve locations in the CNS 122) known by the host computing devices 102(1) and 102(2) prior to, or exchanged by the host computing devices 102(1) and 102(2) during, an initialization process. The first on-disk CNS mapping table 126 and the second on-disk CNS mapping table 128 store entries that include translations from logical address (e.g., logical block address (LBA) or logical block number) to physical address (i.e., in the user data 134 maintained on the flash storage media in the CNS 122 of the SSD 110).

Accordingly, the first on-disk CNS mapping table 126 and the second on-disk CNS mapping table 128 are utilized by the host computing devices 102(1) and 102(2) to service storage operations, as described and illustrated in more detail later. Each of the first on-disk CNS mapping table 126 and the second on-disk CNS mapping table 128 is associated with a respective generation number, for example, that indicates which of the first on-disk CNS mapping table 126 or the second on-disk CNS mapping table 128 has been updated most recently, which is used to refresh a cached, in-core CNS mapping table, also as described and illustrated in more detail later. While multiple on-disk CNS mapping tables 126 and 128 are utilized in this example, only one CNS mapping table can also be used in other examples.

The ZNS 124 stores data in zones that correspond to logical address ranges and are written sequentially and, if written again, are reset. The on-disk ZNS mapping table 130 includes entries that are indexed by logical address and identify a previous zone, if any, and a current zone. Entries that include an indication of a previous zone are currently open and entries that do not include a previous zone are considered finished and can be read from but not written to.

Since zones must be written to as a unit, the previous zone refers to a previously-completed or finished zone that was subsequently reopened (e.g., written to), requiring that the data of the previous zone be rewritten to the current, open zone. Upon finishing an open zone (e.g., by writing the new data and any data from the previous zone), the previous zone is optionally added to the free zone list 132 and the entry in the on-disk ZNS mapping table 130 is updated to remove the indication of the previous zone, as described and illustrated in more detail later. The previous zone is now free because all of the data that was not overwritten was moved to the new, current zone, which is now considered to be finished.

The aggregates in this example include volumes, which are virtual data stores or storage objects that define an arrangement of storage and one or more file systems within the network environment 100. Volumes can span a portion of a disk or other storage device, a collection of disks, or portions of disks, for example, and typically define an overall logical arrangement of data storage. In one example, volumes can include stored user data as one or more files, blocks, or objects that reside in a hierarchical directory structure within the volumes.

Volumes are typically configured in formats that may be associated with particular storage systems, and respective volume formats typically comprise features that provide functionality to the volumes, such as providing the ability for volumes to form clusters, among other functionality. Optionally, one or more of the volumes can be in composite aggregates and can extend between the SSD 110 and one or more other storage devices and, optionally, one or more cloud storage device(s) (not shown) to provide tiered storage, for example, and other arrangements can also be used in other examples.

To facilitate access to data stored on the SSD 110, a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the SSD 110, which can be part of a Redundant Array of Independent (or Inexpensive) Disks (RAID system) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

Figure 2:
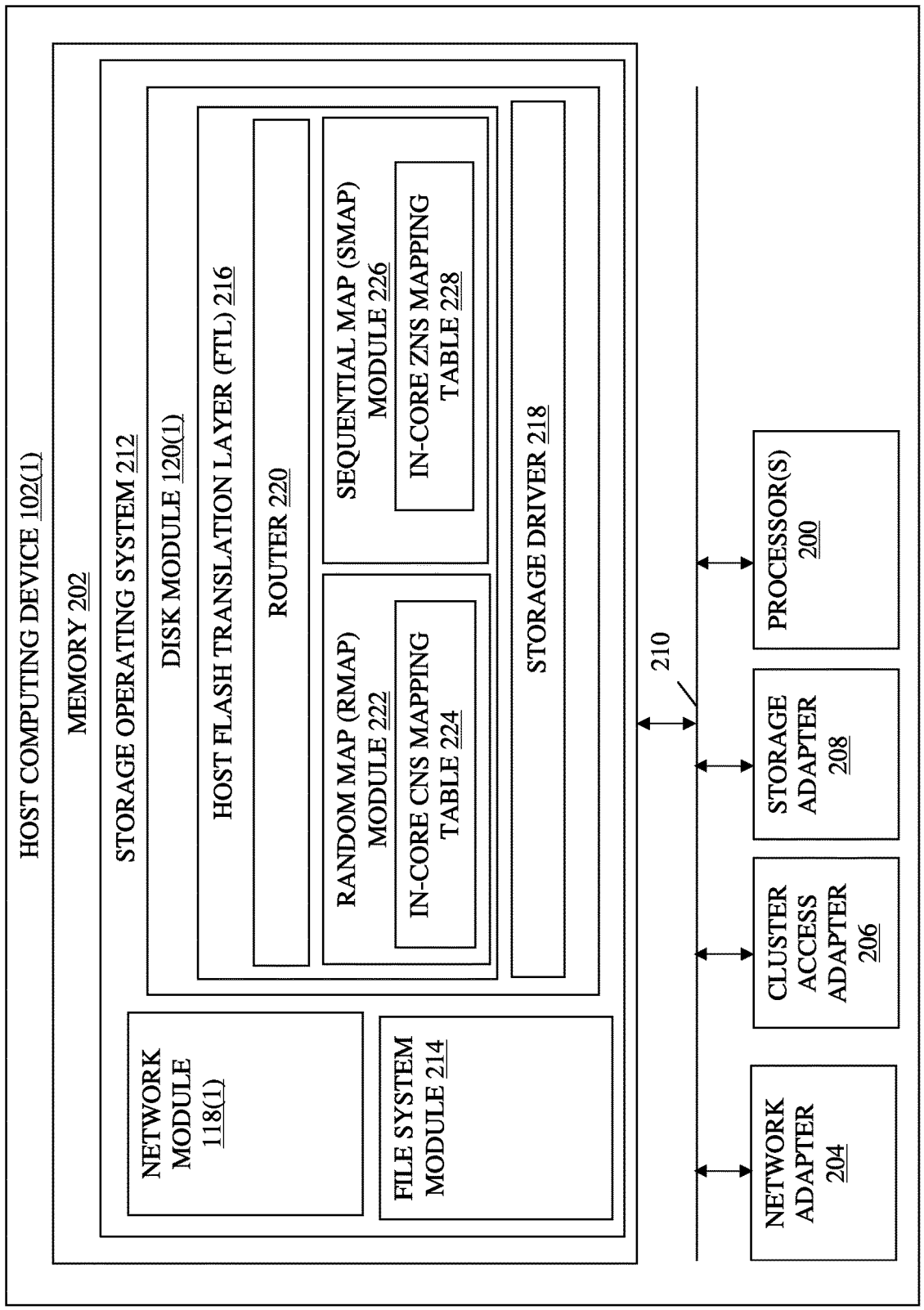
FIG. 2 is a block diagram of an exemplary host device.

Referring to FIG. 2, host computing device 102(1) in this particular example includes processor(s) 200, a memory 202, a network adapter 204, a cluster access adapter 206, and a storage adapter 208 interconnected by a system bus 210. The host computing device 102(1) also includes a storage operating system 212 installed in the memory 202 that includes a file system module 214, the network module 118(1), and the disk module 120(1), although other applications and/or module can also be provided as part of the operating system 212.

The disk module 120(1) further includes a host flash translation layer (FTL) 216 and a storage driver 218 in this example, and the host FTL 216 includes a random map (RMAP) module 222 with an in-core CNS mapping table 224 and a sequential map (SMAP) module 226 with an in-core ZNS mapping table 228. The in-core CNS mapping table 224 and in-core ZNS mapping table 228 are effectively cached versions of the on-disk CNS mapping table 126 or 128 and the on-disk ZNS mapping table 130 illustrated in FIG. 1, respectively. In some examples, the host computing device 102(2) is substantially the same in structure and/or operation as host computing device 102(1), although the host computing device 102(2) can also include a different structure and/or operation in one or more aspects than the host computing device 102(1).

The network adapter 204 in this example includes the mechanical, electrical and signaling circuitry needed to connect the host computing device 102(1) to one or more of the client devices 114(1)-114(n) over network connections 116(1)-116(n), which may comprise, among other things, a point-to-point connection or a shared medium, such as a local area network. In some examples, the network adapter 204 further communicates (e.g., using TCP/IP) via the data fabric 104 and/or another network (e.g. a WAN) with cloud storage device(s) (not shown) to process storage operations associated with data stored thereon.

The storage adapter 208 cooperates with the storage operating system 212 executing on the host computing device 102(1) to access information requested by the client devices 114(1)-114(n) (e.g., to access data on the SSD 110). In some examples, the SSD 110 stores a cache for data maintained on one or more other data storage devices (not shown) coupled to the host computing device 102(1). The data maintained on the other data storage devices may be stored on any type of attached array of writeable media such as magnetic disk drives, flash memory, and/or any other similar media adapted to store information.

In the data storage devices and/or the SSD 110, information can be stored in data blocks. The storage adapter 208 can include I/O interface circuitry that couples to the data storage devices over an I/O interconnect arrangement, such as a storage area network (SAN) protocol (e.g., Small Computer System Interface (SCSI), Internet SCSI (iSCSI), hyperSCSI, Fiber Channel Protocol (FCP)). Information retrieved by the storage adapter 208 and can be processed by the processor(s) 200 (or the storage adapter 208 itself) prior to being forwarded over the system bus 210 to the network adapter 204 (and/or the cluster access adapter 206 if sending to another node) where the information is formatted into a data packet and returned to a requesting one of the client devices 114(1)-114(n) and/or sent to another node attached via the data fabric 104.

In some examples, the storage driver 218 in the storage operating system 212 interfaces with the storage adapter 208 to facilitate interactions with the data storage devices. In particular, the storage driver 218 is used to communicate device commands and read/write requests that may be initiated by the RMAP module 222 or SMAP module 226, for example, to disk devices (not shown), as well as the SSD 110.

The storage operating system 212 can also manage communications for the host computing device 102(1) among other devices that may be in a clustered network, such as attached to a data fabric 104. Thus, the host computing device 102(1) can respond to client requests to manage data on the SSD 110, other data storage devices, or cloud storage device(s) (e.g., or additional clustered devices) in accordance with the client requests.

The file system module 214 of the storage operating system 212 can establish and manage one or more filesystems including software code and data structures that implement a persistent hierarchical namespace of files and directories, for example. As an example, when a new data storage device (not shown) is added to a clustered network system, the file system module 214 is informed where, in an existing directory tree, new files associated with the new data storage device are to be stored. This is often referred to as "mounting" a filesystem.

In the example host computing device 102(1), the memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212 also invokes storage operations in support of a file service implemented by the host computing device 102(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the storage operating system 212 also includes the host flash translation layer (FTL) 216, which is responsible for translating the storage operations (i.e., read/write requests from applications) directly to accesses to flash media (e.g., not-and (NAND) flash memory) of the SSD 110. Accordingly, the host FTL 216 handles and manages the write idiosyncrasies and restrictive rules of the flash storage media. The router 220 of the host FTL 216 processes incoming storage operations and determines whether to route the storage operations to the RMAP module 222 or the SMAP module 226. The routing of a storage operation can be based on a characteristic(s) or parameter(s) of the storage operation, including whether a logical address in the storage operation falls within a range allocated to the CNS 122 or ZNS 124, for example.

The RMAP module 222 manages the storage operations received from the router 220 that are directed to the user data 134 of the CNS 122 that is maintained in a random format. The RMAP module 222 utilizes the in-core CNS mapping table 224 to locate entries that include translations from a logical address included with a received storage operation to a physical address in the CNS 122. The RMAP module 222 effectively caches a version of whichever of the first on-disk CNS mapping table 126 or the second on-disk CNS mapping table 128 is the most recent at the time that the in-core CNS mapping table 224 is refreshed.

The SMAP module 226 manages storage operations received from the router 220 that are directed to the contents of the ZNS 124 that is maintained in a sequential format. The SMAP module 226 utilizes the in-core ZNS mapping table 228, which is synchronized with the on-disk ZNS mapping table 130 (e.g., whenever there is a restart or a miss in the in-core ZNS mapping table 228), to service read and write operations to the ZNS 124. The operation of the host FTL 216 is described and illustrated in more detail later with reference to FIGS. 3-7.

The examples of the technology described and illustrated herein may be embodied as one or more non-transitory computer readable media (e.g., memory 202) having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-7, for example.

Figure 3:
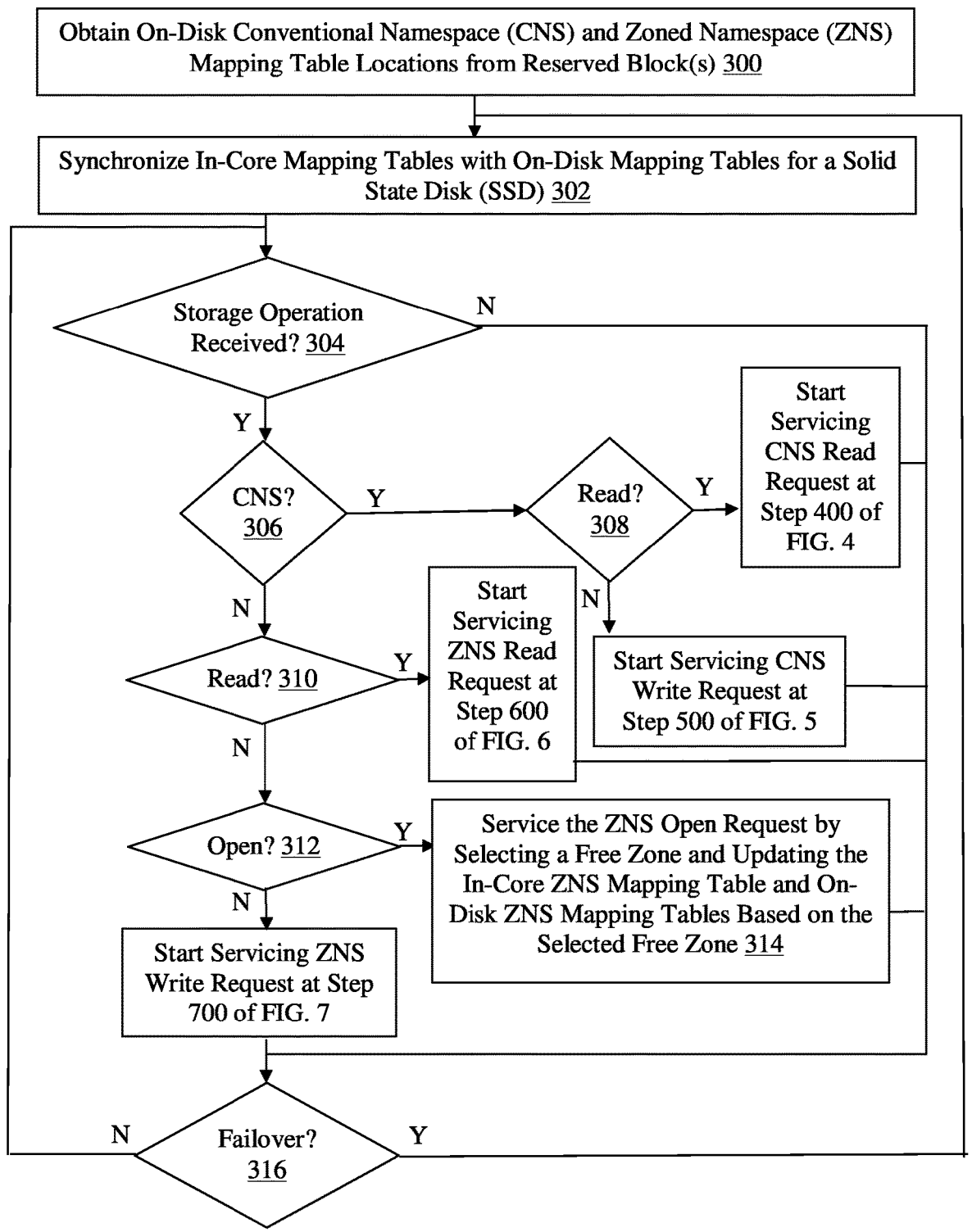
FIG. 3 is a flowchart of an exemplary method for managing resources of a dual-port SSD accessible by multiple host devices.

Referring more specifically to FIG. 3, a flowchart of an exemplary method for managing resources of the SSD 110 that is accessible by the host computing devices 102(1) and 102(2) is illustrated. While the exemplary methods of FIGS. 3-7 are described and illustrated herein as being performed by the host computing device 102(1), in some examples, the host computing device 102(2) is configured in the same manner as the host computing device 102(1), although other configurations can also be used.

In step 300 in this example, the host FTL 216 of the host computing device 102(1) obtains from the SSD 110 the location of the first on-disk CNS mapping table 126, the second on-disk CNS mapping table 128, and the on-disk ZNS mapping table 130, which in some examples is replicated in the CNS 122 in the same or a similar manner as the first on-disk CNS mapping table 126 and the second on-disk CNS mapping table 128, as part of an initialization process for the host computing device 102(1). The initialization process can be performed upon initial start-up and/or following a failover, for example.

In some examples, the host computing device 102(1) is preconfigured with an indication of reserved block(s) in the CNS 122 of the SSD 110 at which the mapping table locations will be stored, although other methods for retrieving the mapping table locations can also be used. In these examples, the host FTL 216 retrieves the mapping table locations from the reserved block(s).

In step 302, the host FTL 216 of the host computing device 102(1) synchronizes the in-core ZNS mapping table 228 with the on-disk ZNS mapping table 130 and the in-core CNS mapping table 224 with one of the first on-disk CNS mapping table 126 or the second on-disk CNS mapping table 128. In this example, the first on-disk CNS mapping table 126 and the second on-disk CNS mapping table 128 are each associated with a respective generation number. Accordingly, the host FTL 216 stores, in the in-core CNS mapping table 224, the contents of whichever of the first on-disk CNS mapping table 126 or the second on-disk CNS mapping table 128 is associated with the most recent (e.g., highest) generation number to implement the synchronization. Since there are two host computing device 102(1) that could be attempting to update the on-disk CNS mapping tables 126 and 128 at substantially the same time, they can each write to a respective one of the on-disk CNS mapping tables 126 and 128 in an atomic transaction and, if there is a failure before both on-disk CNS tables 126 and 128 are able to be updated, the surviving host computing device will have an update table from which to replace its in-core CNS mapping table.

In other examples, timestamps can be used for versioning instead of generation numbers, and other types of indications can also be used to identify which of the first on-disk CNS mapping table 126 or the second on-disk CNS mapping table 128 is the most up-to-date. Additionally, if the generation numbers are equivalent, either the first on-disk CNS mapping table 126 or the second on-disk CNS mapping table 128 can be used for the synchronization. In yet other examples, a similar or the same versioning system can be used for multiple on-disk ZNS mapping tables. While in this example the in-core CNS mapping table 224 is synchronized upon initialization (e.g., subsequent to a restart of the host computing device 102(1)), in other examples, the in-core CNS mapping table 224 can be synchronized or populated lazily as storage operations are serviced.

In step 304, the host FTL 216 of the host computing device 102(1) determines whether a storage operation is received, such as from one of the client devices 114(1)-114(n), for example. If the host FTL 216 determines that a storage operation is received, then the host FTL 216 sends the storage operation to the router 220 and the Yes branch is taken to step 306.

In step 306, the router 220 of the host computing device 102(1) determines whether the storage operation is directed to the CNS 122 or the ZNS 124. In this example, the determination in step 306 is made based on the logical address associated with the storage operation, a type of the storage operation (e.g., a request to open a zone), or any other characteristic(s) or parameter(s) of the storage operation. If the router 220 determines that the storage operation is directed to the CNS, then the router 220 sends the storage operation to the RMAP module 222 and the Yes branch is taken to step 308.

In step 308, the RMAP module 222 of the host computing device 102(1) determines whether the storage operation is a read request or a write request based on an indication of the type of operation included with the request. If the RMAP module 222 determines that the storage operation is a read request, then the Yes branch is taken to step 400 of FIG. 4 in which the RMAP module 222 begins servicing the read request that is directed to the CNS 122.

Figure 4:
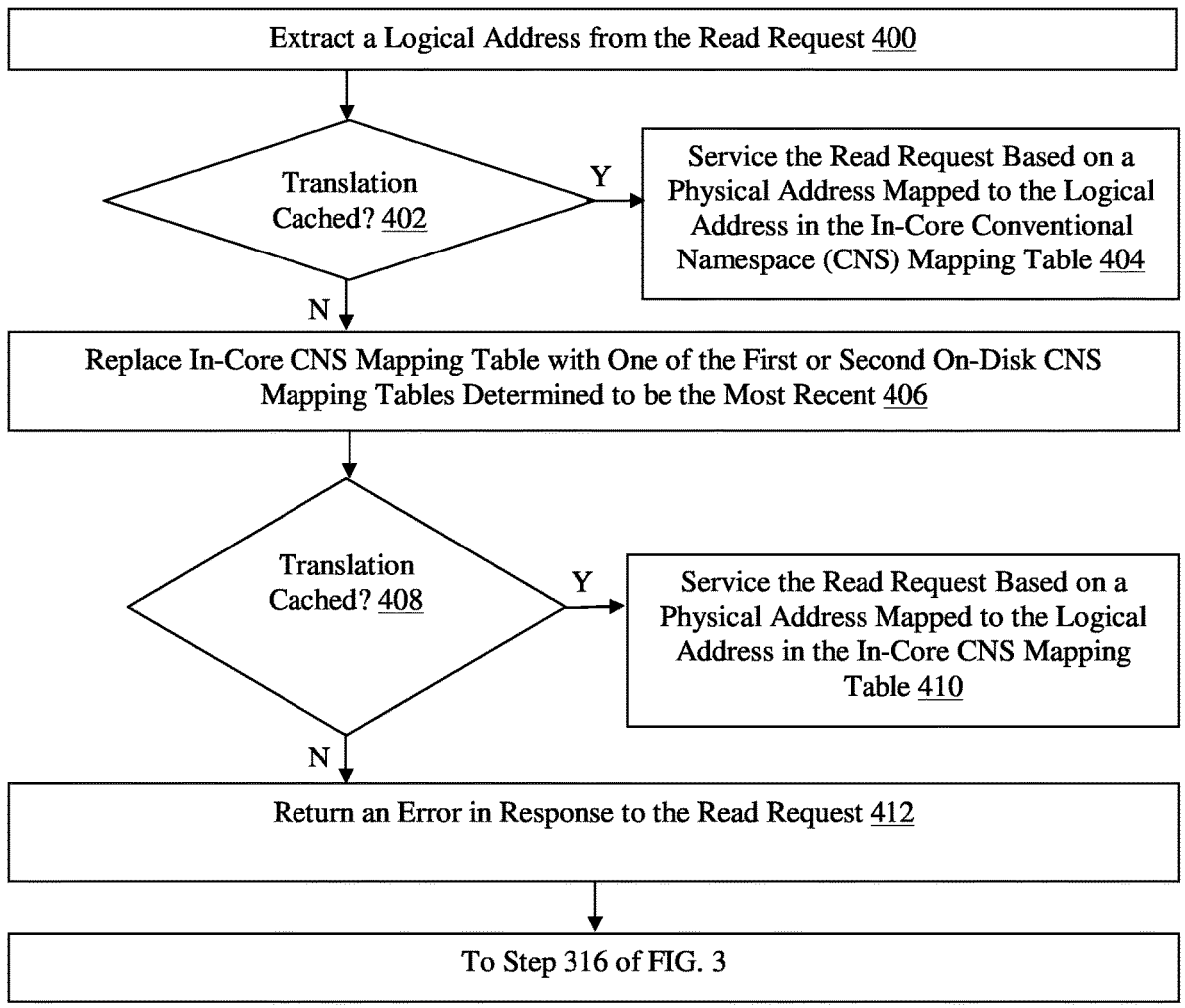
FIG. 4 is a flowchart of an exemplary method for servicing read requests to a conventional namespace (CNS) of a dual-port SSD.

Accordingly, referring to FIG. 4, a flowchart of an exemplary method for servicing read requests to the CNS 122 of the SSD 110 is illustrated. In step 400 in this example, the RMAP module 222 of the host computing device 102(1) extracts a logical address from the read request received from the router 220. The logical address in this example corresponds with a physical location of a portion of user data 134 on the SSD 110.

In step 402, the RMAP module 222 of the host computing device 102(1) determines whether a translation for the logical address is cached based on whether there is an entry in the in-core CNS mapping table 224 that includes the extracted logical address. If the RMAP module 222 determines that the translation for the logical address is cached, then the Yes branch is taken to step 404.

In step 404, the RMAP module 222 of the host computing device 102(1) services the read request based on the physical address mapped to the logical address in the matching entry in the in-core CNS mapping table 224. Accordingly, the RMAP module 222 can retrieve from the SSD 110 the portion of the user data 134 that corresponds with the physical address mapped to the logical address and return the portion of the user data 134 in response to the read request, such as to a requesting one of the client device 114(1)-114(n), for example. However, if the RMAP module 222 determines in step 402 that the translation for the extracted logical address is not cached, then the No branch is taken to step 406.

In step 406, the RMAP module 222 of the host computing device 102(1) replaces the in-core CNS mapping table 224 with whichever of the first on-disk CNS mapping table 126 or the second on-disk CNS mapping table 128 is determined by the RMAP module 222 to be the most recent, such as based on an associated generation number, for example. The location of the first on-disk CNS mapping table 126 and the second on-disk CNS mapping table 128 can be retrieved from reserved locations or block(s) on the SSD 110, for example, as described in more detail earlier. Accordingly, the in-core CNS mapping table 224 is replaced and resynchronized with one of the first on-disk CNS mapping table 126 or the second on-disk CNS mapping table 128 whenever a translation for the logical address of a received storage operation is not cached in the in-core CNS mapping table 224.

In step 408, the RMAP module 222 of the host computing device 102(1) determines whether the translation for the extracted logical address is cached subsequent to the replacement of the in-core CNS mapping table 224. If the RMAP module 222 determines that the translation is now cached, then the Yes branch is taken to step 410.

In step 410, the RMAP module 222 of the host computing device 102(1) services the read request based on the physical address mapped to the logical address in a corresponding entry of the in-core CNS mapping table 224. Accordingly, in this example, the host computing device 102(2) wrote the associated portion of the user data 134, corresponding to the physical address mapped to the logical address, subsequent to the most recent synchronization of the in-core CNS mapping table 224 by the host computing device 102(1). By re-synchronizing the in-core CNS mapping table 224, this technology allows the host computing device 102(1) to determine the translation even though it was generated and stored by the other host computing device 102(2) that accessed the SSD 110 via the second port 108, for example, without requiring any explicit communication between the host computing devices 102(1) and 102(2). However, if the RMAP module 222 determines in step 408 that the translation is still not cached subsequent to replacement of the in-core CNS mapping table 224, then the No branch is taken to step 412.

In step 412, the RMAP module 222 of the host computing device 102(1) returns an error in response to the read request. If the translation for the extracted logical address is still not cached after the in-core CNS mapping table 224 is replaced, then neither the host computing device 102(1) nor the host computing device 102(2) previously wrote data at a physical address that corresponds to the logical address included in the read request. Subsequent to returning the error, the RMAP module 222 proceeds to step 316 of FIG. 3, where an example will be described in detail later.

Referring back to step 308 of FIG. 3, if the RMAP module 222 instead determines that the received storage operation (already determined to be a storage operation directed to the CNS 122) is not a read request, then the storage operation is a write request that is directed to the CNS 122. Therefore, the No branch is taken to step 500 of FIG. 5 in which the RMAP module 222 begins servicing the write request.

Figure 5:
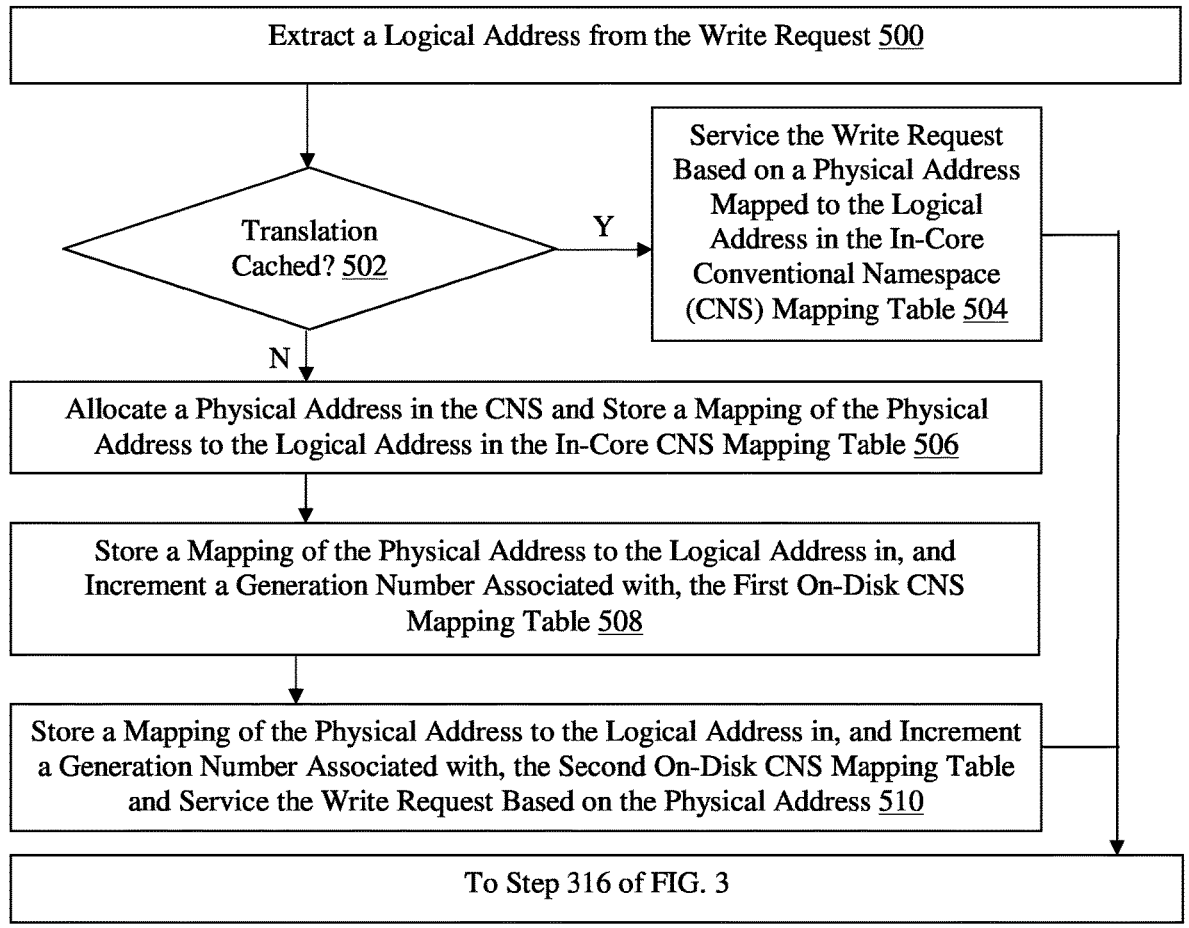
FIG. 5 is a flowchart of an exemplary method for servicing write requests to a CNS of a dual-port SSD.

Accordingly, referring to FIG. 5, a flowchart of an exemplary method for servicing write requests to the CNS 122 of the SSD 110 is illustrated. In step 500 in this example, the RMAP module 222 of the host computing device 102(1) extracts a logical address from the write request, as described and illustrated in more detail earlier with reference to step 400 of FIG. 4, for example.

In step 502, the RMAP module 222 of the host computing device 102(1) determines whether the translation is cached. The translation is cached when an entry with a logical address matching the extracted logical address is located in the in-core CNS mapping table 224, as described and illustrated in more detail earlier with reference to steps 402 and 408 of FIG. 4, for example. If the RMAP module 222 determines that the translation for the logical address is cached, then the Yes branch is taken to step 504.

In step 504, the RMAP module 222 of the host computing device 102(1) services the write request based on a physical address mapped to the extracted logical address in the in-core CNS mapping table 224. The physical address points to a particular location within the user data 134 in the CNS 122. However, if the RMAP module 222 determines in step 502 that the translation is not cached, then the No branch is taken to step 506.

In step 506, the RMAP module 222 of the host computing device 102(1) allocates a physical address in the CNS 122 of the SSD 110 at which to store the data associated with the write request. Since the translation for the extracted logical address is not cached in this example, the write request is a request to write new data, and not a request to modify previously-written data. Accordingly, the RMAP module 222 allocates a physical address at which the data associated with the write request is to be written in the CNS 122. The RMAP module 222 also stores a mapping of the allocated physical address to the extracted logical address in an entry of the in-core CNS mapping table 224.

In step 508, the RMAP module 222 of the host computing device 102(1) updates the first on-disk CNS mapping table 126 to include the corresponding entry with the translation that was stored in the in-core CNS mapping table 224 in step 506. The insertion of the entry in the first on-disk CNS mapping table 126 is performed by the RMAP module 222 using an atomic operation (e.g., a compare-and-swap or compare-and-write command), although other methods of updating the first on-disk CNS mapping table 126 can also be used in other examples. The RMAP module 222 also increments the generation number associated with the first on-disk CNS mapping table 126.

In step 510, the RMAP module 222 of the host computing device 102(1) updates the second on-disk CNS mapping table 128 to include the corresponding entry with the translation that was stored in the in-core CNS mapping table 224 in step 506. The insertion of the entry in the second on-disk CNS mapping table 128 is also performed by the RMAP module 222 using an atomic operation in this example, although other methods of updating the second on-disk CNS mapping table 128 can also be used. The RMAP module 222 also increments the generation number associated with the second on-disk CNS mapping table 128 in this example in which generation numbers are used for versioning.

By utilizing generation numbers, the host computing devices 102(1) and 102(2) can determine which of the first on-disk CNS mapping table 126 or the second on-disk CNS mapping table 128 to use for synchronization in the event that one of the host computing devices 102(1) or 102(2) fails after completion of step 508 but before the mapping is stored in step 510, for example. In other examples the RMAP module 222 can utilize a timestamp or other method of versioning. The RMAP module 222 subsequently services the write request by storing the data associated with the write request based on the physical address allocated in step 506. Subsequent to servicing the write request in step 504 or 510, the RMAP module 222 proceeds to step 316 of FIG. 3, which will be described in detail later.

Referring back to step 306 of FIG. 3, if the router 220 instead determines in step 306 that the received storage operation is not directed to the CNS 122, then the router 220 determines that the storage operation is directed to the ZNS 124. Accordingly, the router 220 sends the storage operation to the SMAP module 226 and the No branch is taken to step 310.

In step 310, the SMAP module 226 of the host computing device 102(1) determines whether the storage operation is a read request based on an indication of the type of operation included with the request, for example. If the SMAP module 226 determines that the storage operation is a read request, then the Yes branch is taken to step 600 of FIG. 6 in which the SMAP module 226 begins servicing the read request that is directed to the ZNS 124.

Figure 6:
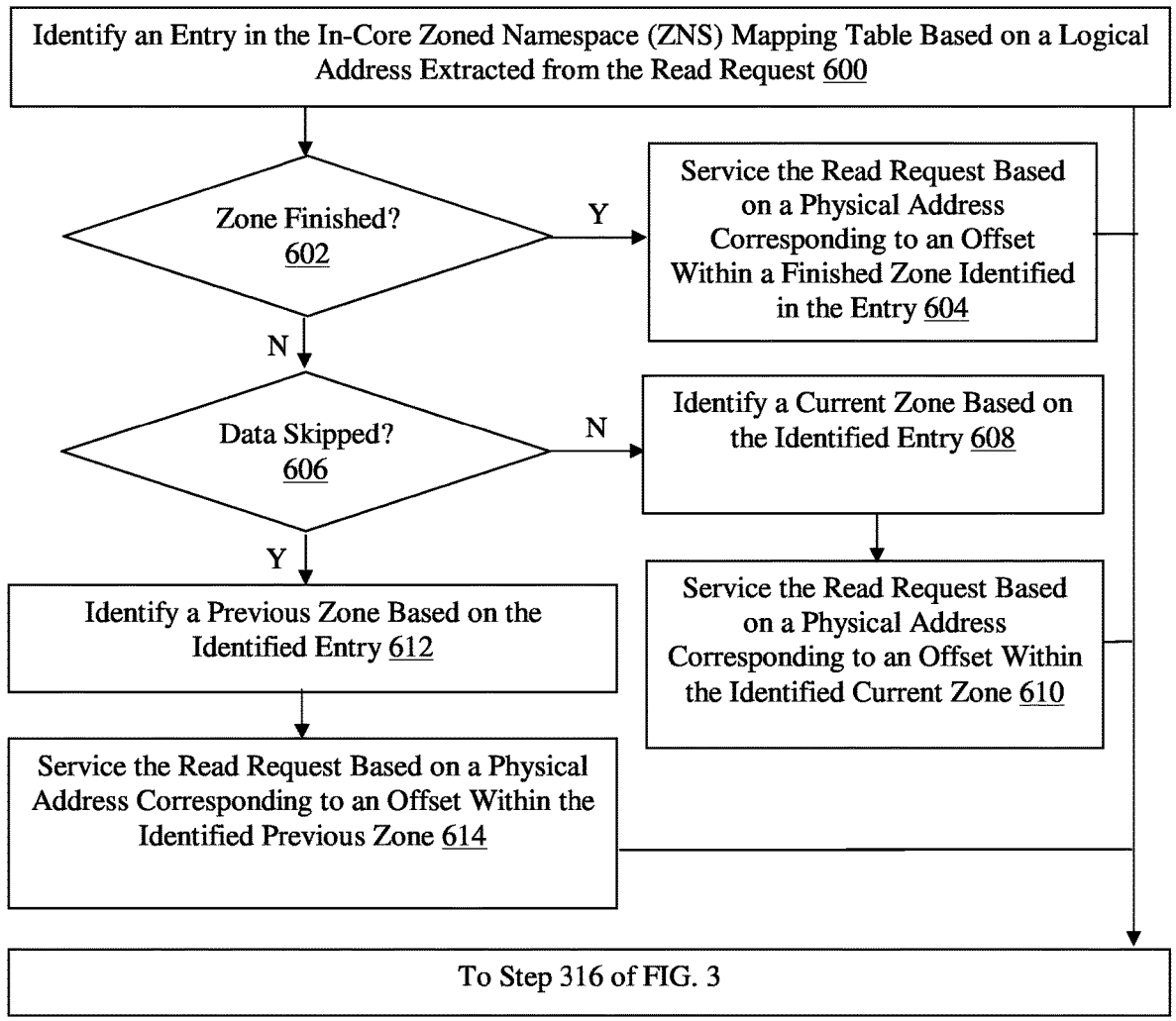
FIG. 6 is a flowchart of an exemplary method for servicing read requests to a zoned namespace (ZNS) of a dual-port SSD.

Accordingly, in FIG. 6 a flowchart of an exemplary method for servicing read requests directed to the ZNS 124 of the SSD 110 is illustrated. In step 600 in this example, the SMAP module 226 of the host computing device 102(1) identifies an entry in the in-core ZNS mapping table 228 based on a logical address extracted from the read request. The entry can be determined in one example based on dividing the logical address by a zone size or number of zones in the ZNS 124, for example, although other methods of identifying the entry can also be used.

In step 602, the SMAP module 226 of the host computing device 102(1) determines whether the zone corresponding to the entry in the in-core ZNS mapping table 228 is a finished zone. In one example, the entry corresponds to a finished zone when the entry does not identify both a previous zone and a current zone. In other words, if the entry identifies only a current zone, then the zone is an open zone that is currently being written, and is not therefore a finished zone. In other examples, flags, indications, and/or other methods for determining whether the entry corresponds to a finished zone can also be used. If the SMAP module 226 determines that the identified entry corresponds to a finished zone, then the Yes branch is taken to step 604.

In step 604, the SMAP module 226 of the host computing device 102(1) services the read request based on a physical address corresponding to an offset within the finished zone identified in the entry in the in-core ZNS mapping table 228. Accordingly, the entry includes an indication of a finished zone (e.g., in a "current zone" column of the entry row). The offset in one example is determined based on a remainder of the division of the extracted logical address by the zone size or number of zones used to identify the entry in step 600, although other methods for determining the offset can also be used.

To service the read request, the SMAP module 226 interfaces with the SSD 110 to retrieve the data (e.g., block(s)) associated with a physical address on the SSD 110 corresponding to the determined offset and the identified finished zone (e.g., from the in-core ZNS namespace table 228). However, if the SMAP module 226 determines in step 602 that the zone associated with the entry in the in-core ZNS mapping table 228 is not finished, then the No branch is taken to step 606.

In step 606, the SMAP module 226 of the host computing device 102(1) determines whether the data (e.g., block(s)) associated with a physical address corresponding to the extracted logical address was skipped, or has otherwise not yet been written to the open zone. The SMAP module 226 can generate the physical address as described and illustrated in more detail earlier with reference to step 604, for example, in order to determine whether the data was skipped. The data could have been skipped because it cannot be overwritten, for example, although the data could have been skipped for another reason.

In some examples, skipped data can be written in parallel with new or updated data being written to the current, open zone of the SSD 110 and, in other example, the skipped data is written when the current, open zone is determined to be finished, but prior to the updating of the in-core ZNS mapping table 228 and/or the on-disk ZNS mapping table 130, as described and illustrated in more detail later. Other methods for writing skipped data to an open zone can also be used in other examples. If the SMAP module 226 determines that the data associated with the physical address corresponding to the extracted logical address was not skipped, then the No branch is taken to step 608.

In step 608, the SMAP module 226 of the host computing device 102(1) identifies a current zone as identified in the entry identified in step 600. If the data was not skipped, then the data resides in the zone identified as the current zone in the identified entry of the in-core ZNS mapping table 228, although other methods for identifying the current zone can also be used.

In step 610, the SMAP module 226 of the host computing device 102(1) services the read request based on a physical address corresponding to an offset within the identified current zone. The physical address can be determined as described and illustrated in more detail earlier with reference to step 604, for example. To service the read request, the SMAP module 226 interfaces with the SSD 110 to retrieve the data (e.g., block(s)) associated with a physical address on the SSD 110 corresponding to the determined offset and the identified current zone. However, referring back to step 606, if the SMAP module 226 determines that the data has been skipped, then the Yes branch is taken to step 612.

In step 612, the SMAP module 226 of the host computing device 102(1) identifies a previous zone based on the identified entry in the in-core ZNS mapping table 228. If the data was skipped, then it resides in the zone identified as the previous zone in the identified entry of the in-core ZNS mapping table 228 (e.g., in a "previous zone" column of the entry table row), although other methods for identifying the previous zone can also be used. Since zones are written as a unit, a write to a zone may be require that some data (e.g., data that cannot be overwritten) be migrated from the previous zone to the current zone, which is referred to herein as skipped data.

In step 614, the SMAP module 226 of the host computing device 102(1) services the read request based on a physical address corresponding to an offset within the identified previous zone. The physical address can be determined as described and illustrated in more detail earlier with reference to step 604, for example. To service the read request, the SMAP module 226 interfaces with the SSD 110 to retrieve the data (e.g., block(s)) associated with a physical address on the SSD 110 corresponding to the determined offset and the identified previous zone. Subsequent to servicing the read request in step 604, 610, or 614, the host computing device 102(1) proceeds to step 316 of FIG. 3, which will be described in detail later.

Referring back to step 310 FIG. 3, if the SMAP module 226 instead determines in step 310 that the received storage operation is not a read request, then the storage operation is either a zone open request or a write request directed to the ZNS 124. Accordingly, the No branch is taken by the SMAP module 226 from step 310 to step 312. In step 312, the SMAP module 226 determines whether the storage operation is a zone open request based on characteristic(s) or a type of the operation, for example. If the SMAP module 226 determines that the storage operation is a zone open request, then the Yes branch is taken to step 314.

In step 314, the SMAP module 226 services the zone open request by selecting a free zone. The free zone can be selected from the free zone list 132, for example, which can be populated as described in more detail later. Since the free zone list 132 is accessible to both host computing devices 102(1) and 102(2), the selection can be managed by atomic operation(s) that update the free zone list 132 to remove an indication of the selected free zone. Other methods of identifying the free one to use to service the open zone request can also be used in other examples.

The SMAP module 226 then opens the zone for writing by inserting an entry into the in-core ZNS mapping table 228 and the on-disk ZNS mapping table 130. The inserted entry includes an indication of a previous zone and a current zone. The indication of the previous zone corresponds to an identifier for the zone to be opened, as indicated in the open zone request, and the indication of the current zone corresponds to an identifier for the free zone selected from the free zone list 132, for example. The entry is inserted at a location determined from contents of the open zone request (e.g., a logical address). However, if the SMAP module 226 determines in step 312 that the storage operation is not a zone open request, then the storage operation is a write request and the SMAP module 226 proceeds to begin servicing the write request directed to the ZNS in step 700 of FIG. 7

Figure 7:
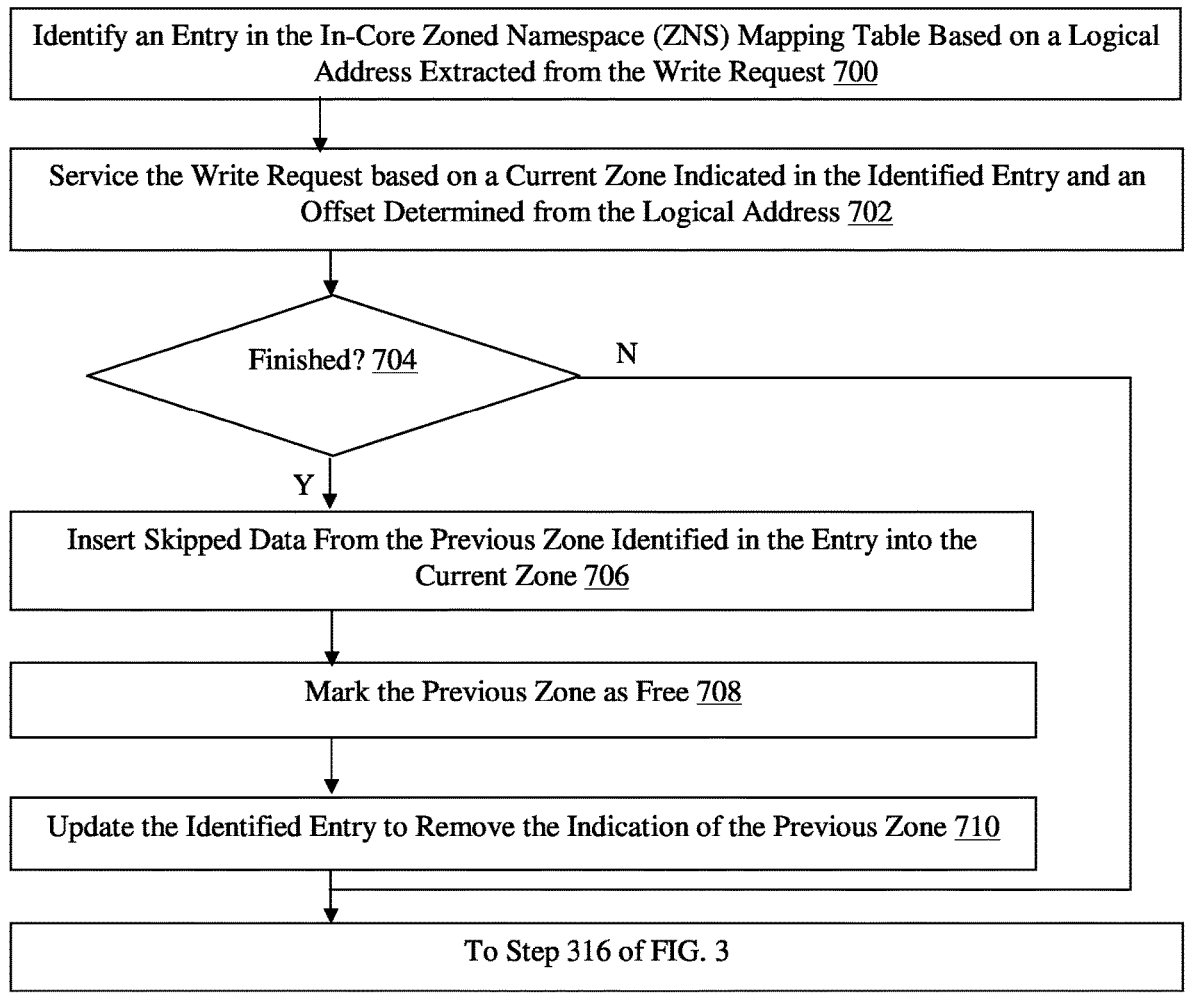
FIG. 7 is a flowchart of an exemplary method for servicing write requests to a ZNS of a dual-port SSD.

Accordingly, referring to FIG. 7, a flowchart of an exemplary method for servicing write requests directed to the ZNS 124 of the SSD 110 is illustrated. In step 700 in this example, the SMAP module 226 of the host computing device 102(1) identifies an entry in the in-core ZNS mapping table 228 based on a logical address extracted from the write request. The entry can be identified as described and illustrated in more detail earlier with reference to step 600 of FIG. 6, for example.

In step 702, the SMAP module 226 of the host computing device 102(1) services the write request based on a current zone indicated in the entry of the in-core ZNP mapping table 228 identified in step 700 and an offset determined from the logical address. In this example, a first write request to a zone in the ZNS 124 is preceded by an open zone request. Accordingly, a write request will be directed to a zone identified as the current zone in the identified entry of the in-core ZNS mapping table 228. The offset can be determined as described and illustrated in more detail earlier with reference to step 604, 610, or 614 of FIG. 6, for example. The SMAP module 226 services the write request by writing the data associated with the write request to the physical location in the ZNS 124 that corresponds to the identified current zone and the determined offset.

In step 704, the SMAP module 226 of the host computing device 102(1) determines whether the zone indicated as the current zone in the entry of the in-core ZNS mapping table 228 identified in step 700 is finished. The determination can be based on the SMAP module 226 reaching the end of the current zone based on a predefined zone size or the determination can be based on a received explicit instruction indicating that the current zone is finished, for example, and the SMAP module 226 can determine that the current zone is finished in other ways in other examples. If the SMAP module 226 determines that the current zone is finished, then the Yes branch is taken to step 706.

In step 706, the SMAP module 226 of the host computing device 102(1) inserts any skipped data from the previous zone identified in the entry of the in-core ZNS mapping table 228 identified in step 700 into the current zone identified in the entry. In this example, the SMAP module 226 inserts the skipped data when the open, current zone is determined to be finished. However, the SMAP module 226 can insert skipped data concurrently with servicing new write requests to an open zone, as described in more detail earlier, and other methods for inserting skipped data can also be used in other examples.

In step 708, the SMAP module 226 of the host computing device 102(1) marks the zone indicated as the previous zone in the entry of the in-core ZNS mapping table 228 as free because the data not overwritten has been copied to the current zone. In one example, the marking can include adding the identifier for the previous zone to the free zone list 132, although the previous zone can be marked as free in other ways in other examples.

In step 710, the SMAP module 226 of the host computing device 102(1) updates the entry of the in-core ZNS mapping table 228, and the corresponding entry of the on-disk ZNS mapping table 130, to remove the indication of the previous zone, such as by deleting the identifier for the previous zone from each of the entries, for example. Subsequent to the update, the entries will include only an identifier for a current zone indicating that the current zone is finished. Additionally subsequent to the update in step 710, or if the SMAP module 226 determines in step 704 that the current zone is not finished and the No branch is taken, then the host computing device 102(1) proceeds to step 316 of FIG. 3.

In step 316 of FIG. 3, the host computing device 102(1) determines whether the host computing device 102(2) has failed. The determination in step 316 can be based on a periodic communication or ping to the host computing device 102(2) or an explicit message from the host computing device 102(2), for example, although any number of others methods of determining that the host computing device 102(2) has failed can also be used in other examples.

If the host computing device 102(1) determines that the host computing device 102(2) has not failed, then the No branch is taken back to step 304, and the host computing device 102(1) continues receiving and servicing storage operations. However, if the host computing device 102(1) determines that the host computing device 102(2) has failed, then the host computing device 102(1) optionally proceeds back to step 302 and re-synchronizes the in-core CNS mapping table 224 and the in-core ZNS mapping table 228, as described and illustrated in more detail earlier. While step 316 is illustrated as occurring subsequent to other steps in FIG. 3, step 316, as well as one or more other of steps 300-314, can occur in parallel in other examples.

As described and illustrated by way of the examples herein, this technology allows multiple host computing devices coupled to a dual-port SSD to efficiently share resources and metadata information regarding utilization of, and contents stored on, the dual-port SSD. This technology utilizes atomic operations to update mapping tables that store translations for user data maintained in a CNS and the contents of a ZNS of the dual-port SSD. The mapping tables are maintained in-core and synchronized with mapping tables maintained on-disk in order to facilitate efficient failover when the multiple hosts are in an HA arrangements. Accordingly, resources are managed automatically with this technology, which reduces data fabric bandwidth and improves data storage network performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A computing device, comprising:
    a memory containing machine readable media comprising machine executable code having stored thereon instructions; and
    a processor coupled to the memory and a first port of a dual-port solid state disk (SSD) and configured to execute the machine executable code to cause the processor to:
        retrieve an identifier for a previous zone of a plurality of zones of a zoned namespace (ZNS) of the dual-port SSD from an entry of an in-core ZNS mapping table, wherein the entry corresponds to a logical address extracted from a read request;
        generate a physical location in the ZNS based on an offset and the previous zone, wherein the offset is determined from the logical address; and
        return data retrieved from the physical location in order to service the read request when a current zone of the plurality of zones identified in the entry is unfinished and the data is determined to have been skipped.

2. The computing device of claim 1, wherein the processor is further configured to execute the machine executable code to further cause the processor to return other data retrieved from another physical location in the ZNS in order to service the read request when the current zone is unfinished and the data is determined to have been written to the current zone, wherein the another physical location is generated based on the offset and the current zone.

3. The computing device of claim 1, wherein the processor is further configured to execute the machine executable code to further cause the processor to identify another entry in an in-core conventional namespace (CNS) mapping table based on the logical address and service the read request using a translation in the another entry for the logical address when the read request is directed to the CNS.

4. The computing device of claim 3, wherein the processor is further configured to execute the machine executable code to further cause the processor to synchronize the in-core CNS and ZNS mapping tables stored in the memory with on-disk CNS and ZNS mapping tables, respectively.

5. The computing device of claim 4, wherein the on-disk CNS and ZNS mapping tables are stored in a CNS of the dual-port SSD, the CNS is maintained in a random format, and a ZNS of the dual-port SSD is maintained in a sequential format.

6. The computing device of claim 4, wherein the on-disk CNS and ZNS mapping tables are accessible by the computing device via the first port and at least one other computing device via a second port of the dual-port SSD and are maintained using one or more atomic transactions.

7. The computing device of claim 4, wherein the processor is further configured to execute the machine executable code to further cause the processor to retrieve the on-disk CNS and ZNS mapping tables based on one or more locations retrieved from one or more reserved blocks of the dual-port SSD in order to facilitate the synchronization.

8. A method, comprising:
retrieving, by a computing device, an identifier for a current zone of a plurality of zones of a zoned namespace (ZNS) of a dual-port solid state disk (SSD) from an entry of an in-core ZNS mapping table, wherein the entry corresponds to a logical address extracted from a write request;
generating, by the computing device, a physical location in the ZNS based on an offset and the current zone, wherein the offset is determined from the logical address;
storing, by the computing device, write data associated with the write request at the physical location in order to service the write request; and
inserting, by the computing device, skipped data from a previous zone of the plurality of zones that is identified in the entry into the current zone.

9. The method of claim 8, further comprising updating, by the computing device, the entry, and via an atomic operation another entry of an on-disk ZNS mapping table, to remove another identifier of the previous zone subsequent to the insertion of the skipped data.

10. The method of claim 8, further comprising inserting, by the computing device, the skipped data into the current zone when the current zone is determined to be finished after storing the write data.

11. The method of claim 8, further comprising marking, by the computing device, the previous zone as free after inserting the skipped data.

12. The method of claim 11, further comprising inserting, by the computing device, the another identifier into a free zone list to mark the previous zone as free, wherein the free zone list is maintained in a conventional namespace (CNS) of the dual-port SSD and is accessible by multiple computing devices coupled to the dual-port SSD.

13. A non-transitory machine readable medium having stored thereon instructions comprising machine executable code that, when executed by at least one machine, causes the machine to:

select a free zone of a plurality of zones of a zoned namespace (ZNS) of a dual-port solid state disk (SSD) in response to a zone open request,
insert an entry into an in-core ZNS mapping table and an on-disk ZNS mapping table, wherein the entry comprises an indication of a current zone of the plurality of zones corresponding to an identifier for the free zone and another indication of a previous zone of the plurality of zones corresponding to another identifier included in the zone open request;
retrieve the indication of the current zone from the entry of an in-core ZNS mapping table based on a logical address extracted from a write request received after the zone open request; and
store data associated with the write request at a physical location in the ZNS in order to service the write request, wherein the physical location is generated based on an offset and the current zone and the offset is determined from the logical address.

14. The non-transitory machine readable medium of claim 13, wherein the dual-port SSD comprises a conventional namespace (CNS) accessible by multiple computing devices coupled to the dual-port SSD via respective ports.

15. The non-transitory machine readable medium of claim 14, wherein the machine executable code, when executed by the machine, further causes the machine to select the free zone from a free zone list maintained in the CNS.

16. The non-transitory machine readable medium of claim 15, wherein the machine executable code, when executed by the machine, further causes the machine to select the free zone from the free zone list via an atomic operation.

17. The non-transitory machine readable medium of claim 13, wherein the machine executable code, when executed by the machine, further causes the machine to insert skipped data from the previous zone into the current zone when the current zone is determined to be finished after the data is stored.

18. The non-transitory machine readable medium of claim 13, wherein the machine executable code, when executed by the machine, further causes the machine to synchronize an in-core conventional namespace (CNS) mapping table and the in-core ZNS mapping table with an on-disk CNS mapping table and the on-disk ZNS mapping table, respectively, after determining that the machine has failed.

19. The non-transitory machine readable medium of claim 18, wherein the machine executable code, when executed by the machine, further causes the machine to retrieve the on-disk CNS and ZNS mapping tables based on one or more locations retrieved from one or more reserved blocks of the dual-port SSD in order to facilitate the synchronization.

20. The non-transitory machine readable medium of claim 13, wherein the on-disk ZNS mapping table is stored in a conventional namespace (CNS) of the dual-port SSD and the machine executable code, when executed by the machine, further causes the machine to insert the entry into the on-disk ZNS mapping table via an atomic operation.

* * * * *